United States Patent
Rapp et al.

(10) Patent No.: US 8,481,944 B2
(45) Date of Patent: Jul. 9, 2013

(54) IR SPECTROMETER WITH NON-CONTACT TEMPERATURE MEASUREMENT

(75) Inventors: Norbert Rapp, Hagenbach (DE); Michael Taraschewski, Rheinzabern (DE); Alberto Sossai, Karlsruhe (DE)

(73) Assignee: Bruker Optik GmbH, Ettlingen (DE)

( * ) Notice: Subject to any disclaimer, the term of this patent is extended or adjusted under 35 U.S.C. 154(b) by 20 days.

(21) Appl. No.: 13/137,085

(22) Filed: Jul. 20, 2011

(65) Prior Publication Data

US 2012/0025081 A1 Feb. 2, 2012

(30) Foreign Application Priority Data

Jul. 23, 2010 (DE) .......................... 10 2010 038 329

(51) Int. Cl.
*G01J 3/32* (2006.01)
(52) U.S. Cl.
USPC ...................................................... 250/339.07
(58) Field of Classification Search
USPC ...................................................... 250/339.07
See application file for complete search history.

(56) References Cited

U.S. PATENT DOCUMENTS

| | | | | |
|---|---|---|---|---|
| 5,614,718 A * | 3/1997 | Brace | ........................ | 250/339.13 |
| 6,317,212 B1 * | 11/2001 | Eckles | .......................... | 356/437 |
| 6,612,156 B1 * | 9/2003 | Hakimuddin | ................ | 73/61.75 |
| 6,992,759 B2 * | 1/2006 | Nakayama et al. | ........... | 356/244 |
| 2001/0035957 A1 * | 11/2001 | Clermont et al. | ............. | 356/451 |
| 2007/0263207 A1 * | 11/2007 | Mertz et al. | ................... | 356/300 |

FOREIGN PATENT DOCUMENTS

| | | |
|---|---|---|
| DE | 44 12 887 | 10/1995 |
| WO | WO 00/50893 | 8/2000 |

OTHER PUBLICATIONS

Matrix Spectrometers, Type in 601E, Bruker Optik GmbH, Ettlingen, Germany, 2010.
"Katalog 2005—Metallblock-Thermostate und Evaporatoren" VLM GmbH, Leopoldshoehe-Greste, Germany, (2005).

* cited by examiner

*Primary Examiner* — Marcus Taningco
(74) *Attorney, Agent, or Firm* — Paul Vincent

(57) ABSTRACT

An infrared (IR) spectrometer (20) for IR spectroscopic investigation of a test sample (1) in a first wavenumber range WB1, comprising a sample container (1a) for the test sample (1), wherein the sample container (1a) is transparent to IR radiation in the first wavenumber range WB1, and wherein the IR spectrometer (20) comprises a measuring device for determining the temperature of the test sample (1), is characterized in that the measuring device comprises an IR sensor (2) which measures, without contact, the intensity of the IR radiation emitted by the sample container (1a), and the sample container (1a) is opaque to IR radiation in the second wavenumber range WB2. A simple and reliable measurement of the temperature of a test sample in an IR spectrometer is thereby enabled.

12 Claims, 1 Drawing Sheet

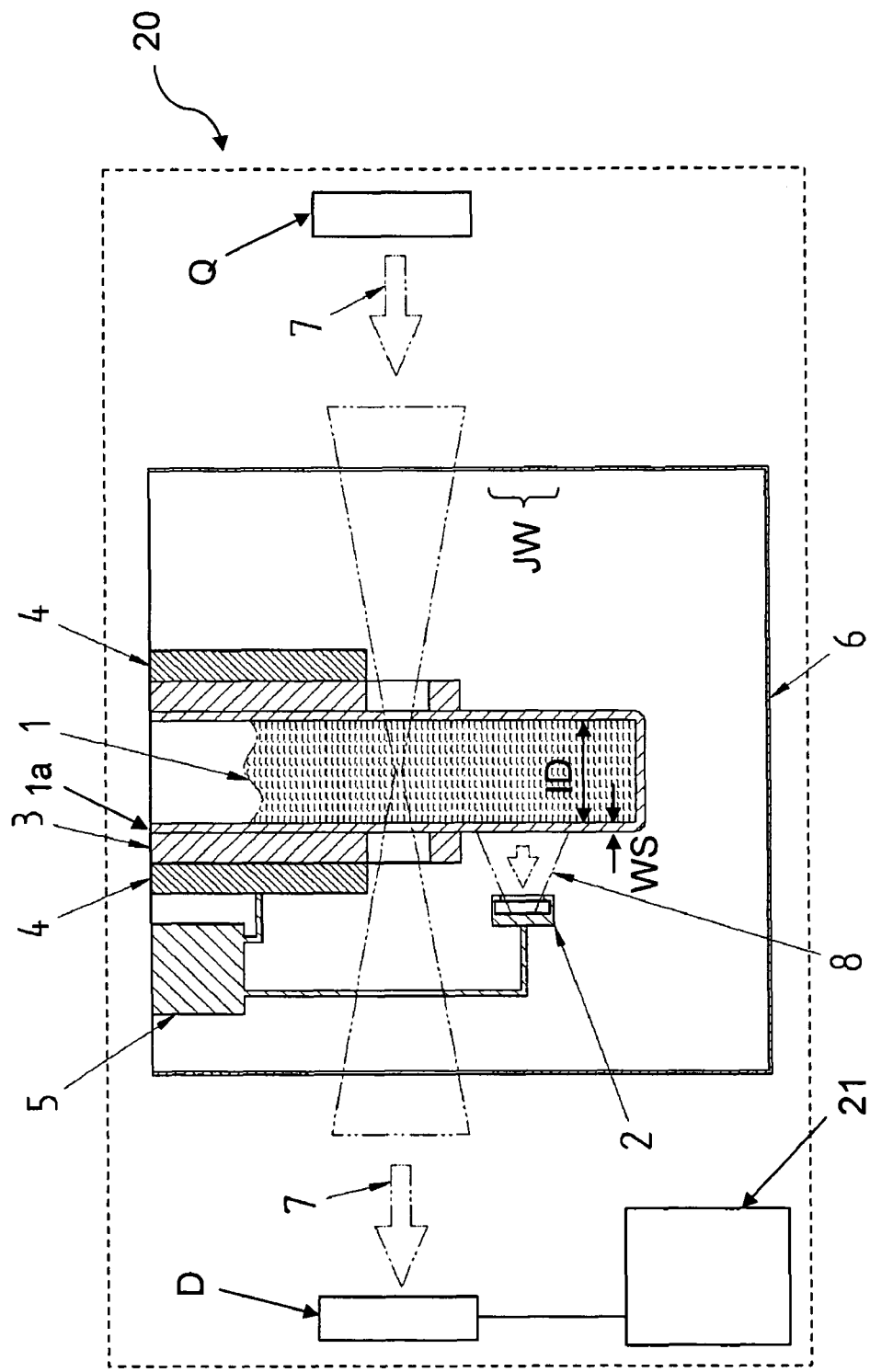

IR SPECTROMETER WITH NON-CONTACT TEMPERATURE MEASUREMENT

This application claims Paris Convention priority of DE 10 2010 038 329.5 filed Jul. 23, 2010 the complete disclosure of which is hereby incorporated by reference.

BACKGROUND OF THE INVENTION

The invention concerns an infrared (IR) spectrometer for IR spectroscopic investigation of a test sample in a first wavenumber range WB1, comprising a sample container for the test sample, wherein the sample container is transparent to IR radiation in the first wavenumber range WB1, and wherein the IR spectrometer comprises a measuring device for determining the temperature of the test sample.

Spectrometers of this type are known e.g. from devices of the MATRIX series of Bruker Optik GmbH, Ettlingen, Germany, for which heatable sample holders are available, e.g. of the type IN 601E.

Analytical information about a sample (test sample) can be obtained by means of infrared (IR) spectroscopy. The molecules in the sample absorb light energy and transform it in a characteristic fashion into oscillations of chemical bonds and rotations of individual molecular groups.

The temperature of the sample has a substantial influence on the physical and chemical behavior of the sample. The temperature not only influences the state of aggregation but also, in general, interactions within the sample (in particular, when it is a mixture of different substances). For this reason, the temperature has a significant influence on the IR spectrum of the sample. For characterization of the sample, the temperature of the sample should therefore also be detected during recording of an IR spectrum. The IR measurement preferably takes place at a predefined temperature, which is controlled during the IR measurement. A local temperature control device is typically used in the IR spectrometer for controlling the temperature of the sample.

In the simplest case, the temperature of a sample is detected by inserting a temperature sensor into the sample (e.g. immersing a thermometer into the sample fluid). This permits relatively exact measurement of the temperature. However, it may happen that the sample is thereby slightly soiled or that an undesired interaction between the temperature sensor and the sample takes place. In general, an additional cleaning step for the temperature sensor is necessary, which reduces the sample throughput.

It is also possible to position the temperature sensor not directly in the sample but in the direct vicinity of the sample, e.g. in a positioning or holding device for a sample container which contains the sample. In order to be able to gain reliable information about the temperature of the sample, the thermodynamic properties of the measuring system (sample, sample container, holding device and, if required, temperature control device) must be exactly known and, if required, controlled. Reliable temperature measurement is only possible in a state of equilibrium. It is, however, not easy to determine when the state of equilibrium has been reached. Moreover, thermal convection can easily cause systematic measuring errors.

The company leaflet "Katalog 2005—Metallblock-Thermostate and Evaporatoren" (Catalogue 2005—metal block thermostats and evaporators) of the company VLM GmbH, Leopoldshöhe-Greste, Germany, in particular page 4, discloses e.g. to arrange a sample that is contained in a sample container (e.g. a test tube) in a heating block and to measure and control the temperature of the heating block by means of a resistance thermometer of the type Pt-100. An external thermometer may additionally be used, which directly measures the temperature in the sample container. This temperature is displayed with the supplement "ST" (sample temperature).

Non-contact measurement of temperatures by means of IR radiation is also known in the art. DE 44 12 887 A1 describes measurement of the temperature of a sample in a container using IR radiation, wherein the container is made from a material that is permeable to IR radiation of a certain spectral range. The IR radiation that was emitted by the sample and has penetrated the container is guided to an IR detector by means of an optical fiber. The container is exposed to a microwave field for heating the sample.

This method is disadvantageous in that the sample must be arranged in a container that is permeable to the IR radiation of the temperature measurement, which limits the choice of materials. The IR radiation of the sample and of the container and possibly of further device components is moreover superimposed beyond the container, which aggravates evaluation of the measurement for determining the temperature. When the sample in the container is exposed to further IR radiation to perform an IR spectroscopic measurement, the determination of the temperature is further aggravated.

It is the underlying object of the present invention to provide simple and reliable measurement of the temperature of a sample in an IR spectrometer.

SUMMARY OF THE INVENTION

This object is achieved by an IR spectrometer of the above-mentioned type, which is characterized in that the measuring device comprises an IR sensor which measures, without contact, the intensity of the IR radiation emitted by the sample container in a second wavenumber range WB2, and the sample container is opaque to IR radiation in the second wavenumber range WB2.

The present invention determines the temperature of the test sample (sample) via the surface temperature of the sample container.

In accordance with the invention, the sample container is transparent to the measuring radiation of the IR spectroscopic measurement (i.e. in the first wavenumber range WB1) and for this reason, does not falsify the IR spectroscopic measurement.

In contrast thereto, the sample container (in contrast to prior art according to DE 44 12 887 A1) is opaque to IR radiation of the temperature measurement (i.e. of the second wavenumber range WB2). For this reason, IR radiation from the inside of the sample container, in particular, from the sample, cannot falsify the temperature measurement. Nor can the IR radiation of the spectroscopic measurement falsify the temperature measurement, since any portions in the second wavenumber range WB2 are blocked by the sample container. Equally, any IR sources beyond the sample and the sample container, e.g. walls of temperature control blocks or measuring chambers, cannot falsify the temperature measurement.

For this reason, the temperature measurement in accordance with the invention is very reliable. The temperature is measured in a non-contact fashion, thereby avoiding any soiling of the sample and thereby also cleaning of a temperature sensor. Two thermal equilibriums develop in the above-mentioned temperature measurement within a temperature control block that surrounds the sample container. The first is generated by a thermal flow between the temperature control block and the sample container. The second is generated between the sample container and the sample itself. In accordance with the present invention, the temperature of the sample container is directly determined. It is therefore not necessary to know the final point of a thermal equilibrium between the temperature control block and the sample container.

For typical amounts and dimensions of samples and sample containers (sample tubes) of IR spectroscopy, the heat capacities are sufficiently small and the heat conduction paths are sufficiently short such that no, or if any, only a minor deviation between the temperature of the filled-in sample and the surface of the sample container is to be expected, and the time required for establishing a thermal equilibrium between the test sample and the sample container can be neglected.

The invention enables, in particular, performance of measurement series in a very effective fashion, in which samples (including sample container) are changed in the IR spectrometer in rapid sequences, wherein the samples are taken from a cooled supply and inserted into a temperature control block. In accordance with the invention, the sample temperature may be determined in a quick and precise fashion on the sample container, whereas for determining the temperature using the temperature control block, one would have to first wait until extensive heat conduction processes in the temperature control block are terminated in order to obtain a thermal equilibrium and be able to determine the sample temperature.

In accordance with the invention, the temperature is typically measured through determination of the integral absolute radiation intensity in the second wavelength range WB2, with calibration of the set-up measuring system (in particular to the type of the sample container that is used). A filter may be arranged upstream of the IR sensor of the temperature measurement, which filter only allows passage of IR radiation of the second wavenumber range WB2. The IR sensor of the temperature measurement is generally used in addition to an IR sensor of the spectroscopic measurement.

The sample container is regarded as being transparent in a wavenumber range, in particular, when the transmission (perpendicular) through the container wall is $\geqq 90\%$ of the intensity, preferably $\geqq 99\%$, for all wavenumbers in the relevant wavenumber range. The sample container is regarded as opaque in a wavenumber range, in particular, when the absorption (perpendicular) through the container wall is $\geqq 90\%$ of the intensity, preferably $\geqq 99\%$, for all wavenumbers in the relevant wavenumber range.

In one particularly preferred embodiment of the inventive IR spectrometer, the sample container completely fills the inspection window of the IR sensor. The sample container in the IR spectrometer is thereby arranged at the measuring position for the IR spectroscopic investigation. This ensures that the temperature measurement is not falsified by IR radiation from surfaces with a different temperature than that of the sample container. The temperature measurement is therefore particularly reliable.

In one preferred embodiment, the first wavenumber range WB1 is in the near infrared range, in particular, in a range between 12800 $cm^{-1}$ and 4000 $cm^{-1}$. It would then e.g. be possible to record an IR spectrum of the sample of between 5000 $cm^{-1}$ and 10000 $cm^{-1}$. The second wavenumber range WB2 is also preferably in the mid infrared range, in particular, in a range between 2000 $cm^{-1}$ and 400 $cm^{-1}$. The temperature could e.g. be measured in a wavenumber window of 500 $cm^{-1}$ to 1000 $cm^{-1}$. There are suitable inexpensive sample container materials, in particular, on the basis of glass, for the above-stated wavenumber ranges.

In one particularly advantageous embodiment, the sample container is surrounded by a temperature control block, which can be heated or cooled by a temperature control system. The temperature of the sample container is controlled by the temperature control block, preferably through planar contact or also through thermal radiation. The temperature control block is preferably produced from metal or a ceramic material having good thermal conductivity, and usually surrounds the test sample like a sleeve (in the measuring position for the IR spectroscopic investigation). The temperature of the sample can be adjusted via the temperature control system, in particular, for performing IR spectroscopic measurements on different samples at the same (reproduced) temperature such that they can be compared.

In a preferred further development of this embodiment, the temperature control system is designed as a Peltier temperature control system. In accordance with the requirements, it heats or cools the sample in a simple fashion, thereby enabling rapid adjustment of different temperatures. It is e.g. alternatively also possible to use ohmic heating systems which work without cooling or also with water cooling.

In another preferred further development of the above-mentioned embodiment, a measuring chamber is formed in which at least the IR sensor, the temperature control block and the sample container are arranged. The measuring chamber may be open or closed. It stabilizes the temperature of the test sample.

In one particularly preferred further development, a temperature control loop is provided, which evaluates the temperature determined by the IR sensor for driving the temperature control system of the temperature control block. This feedback provides particularly precise and quick adjustment of the desired sample temperature.

One orientation of the IR sensor is particularly preferred, wherein the IR sensor and the light beam (IR measuring beam) of the spectrometer detect the same part of the sample. Since the wavelength areas WB1 and WB2 do not overlap, the temperature in the spectroscopically investigated sample area can be precisely allocated. For this reason, (typically vertical) temperature gradients, which may possibly be present within the sample, cannot systematically falsify the measuring result.

The present invention also concerns a method for controlling the temperature control loop of the IR spectrometer in accordance with the last-mentioned further development, which is characterized in that a temperature determined by the IR sensor is corrected with a calibration function such that the corrected temperature approximates the actual temperature of the test sample. The temperature determined by means of the IR sensor corresponds to the surface temperature of the sample container. The calibration function enables taking into consideration a known deviation from the actual temperature of the test sample (i.e. the temperature inside the sample container). This further increases the accuracy of the adjustment of the sample temperature.

The present invention also concerns the use of an inventive IR spectrometer as described above for IR-spectroscopic measurement of a test sample which is not opaque in the second wavenumber range WB2. Since the test sample does not shield IR radiation in the second wavenumber range, this radiation emanating from spectrometer components (e.g. a temperature control block wall) on the side of the test sample opposite to the IR sensor could pass the test sample and falsify the temperature measurement. This is, however, prevented by the inventive opaque properties of the sample container in the second wavenumber range. A test sample is regarded as not being opaque in a wavenumber range, in particular, when the transmission through the test sample via the inner diameter of the sample container is ≧10% of the intensity, preferably ≧1%, for any wavenumber in the relevant wavenumber range.

Further advantages of the invention can be extracted from the description and the drawing. The features mentioned above and below may be used in accordance with the invention either individually or collectively in arbitrary combination. The embodiments shown and described are not to be understood as exhaustive enumeration but have exemplary character for describing the invention.

The invention is illustrated in the drawing and explained in more detail with reference to embodiments.

BRIEF DESCRIPTION OF THE DRAWING

FIG. 1 shows a schematic view of an inventive IR spectrometer with a schematic vertical section through a measuring chamber of the IR spectrometer.

DESCRIPTION OF THE PREFERRED EMBODIMENT

FIG. 1 shows an infrared (IR) spectrometer 20, comprising an IR source Q, a measuring chamber 6, an IR detector D and an evaluation electronics 21. The measuring chamber 6 is thereby illustrated in a schematic vertical sectional view.

IR radiation 7 emanates from the IR source Q, typically an interferometer (which may be accommodated in a separate housing), is transmitted through a test sample 1 contained in a (in the present case approximately tubular) sample container 1a in the measuring chamber 6, and is detected by the IR detector D. The signals of the detector D are analyzed by the evaluation electronics 21, which is typically integrated in a computer, and typically converted into a spectrum (e.g. as part of an FTIR spectroscopy). Only IR radiation of a first wavenumber range WB1 is thereby evaluated for the analytical measurement (e.g. the IR source Q does anyway only emit IR radiation of the first wavenumber range WB1, or the detector D is sensitive only in the first wavenumber range WB1. It is also possible to use upstream filters for the IR source Q or for the IR detector D). The sample container 1a is thereby transparent to the IR radiation of the first wavenumber range WB1.

A major part of the outer surface of the sample container 1a (in the present case approximately 50%) adjoins a temperature control block 3 which typically consists of a metal having good conductivity, e.g. copper. The temperature control block 3 is connected to a Peltier temperature control system 4 which supplies or withdraws heat to/from the temperature control block 3. The Peltier temperature control system 4 is thereby driven by an electronic control system 5. The electronic control system 5 has the task of setting the temperature of the test sample 1 for the IR spectroscopic measurement in a defined fashion, and comprises a control loop for this purpose.

The electronic control system 5 evaluates the information of an IR sensor 2 for driving the Peltier temperature control system 4. Its inspection window 8 (i.e. the solid angle range from which the IR sensor 2 absorbs IR radiation) is completely filled by the sample container 1a. The signals of the IR sensor 2 give information about the temperature of the test sample 1. It should be noted that this temperature measurement is performed in a non-contact fashion, i.e. a falsifying thermal flow at the test sample 1 (including sample container 1a) by the temperature measuring device is impossible. In the illustrated embodiment, the inspection window 8 is moreover spatially offset (not overlapping) with respect to the optical path of the IR radiation of the spectroscopic measurement (in the first wavenumber range WB1). An alternative design utilizes the spatial overlap of the IR radiation of the spectrometer and the range of detection of the temperature sensor in order to avoid systematic measuring errors in case of potential presence of vertical temperature gradients within the sample.

The temperature is measured by exclusively evaluating IR radiation of a second wavenumber range WB2 by means of the IR sensor 2. The sample container 1a is not transparent to IR radiation of the second wavenumber range WB2. For this reason, the IR sensor 2 only detects the surface temperature of the sample container 1a. In particular, IR radiation from beyond the sample container 1a, e.g. from the wall of the measuring chamber 6 in the range JW, is not included in the temperature measurement of the IR sensor 2, since it is blocked by the sample container 1a. IR radiation from the test sample 1 is also not included in the temperature measurement. The type of test sample 1a is rather irrelevant for this type of temperature measurement.

Due to the heat capacity of the sample container 1a, which is generally small compared to the test sample, and due to the wall thickness WS of the sample container 1a, which is small compared to the inner diameter ID of the sample container 1a, the surface temperature of the sample container 1a in a thermal equilibrium generally exactly corresponds to the temperature of the test sample 1, and, in particular, the thermal equilibrium between the test sample 1 and the sample container 1a (or sample container surface) is very quickly established.

If the temperature of the test sample 1 were determined through measurement of the temperature of the temperature control block 3, the establishment of the thermal equilibrium between test sample 1 and temperature control block 3 would require a great deal more time due to the masses involved and longer heat conduction paths, and it could easily happen that a wrong sample temperature is allocated to an IR spectroscopic measurement.

In order to further improve the accuracy of the temperature measurement of the test sample 1 using the IR sensor 2, calibration can be performed by a comparison between temperatures measured in the test sample 1 itself (e.g. measured by an introduced thermoelement) and surface temperatures of the sample container 1a determined by the IR sensor 2.

In accordance with the invention, tubular sample containers having an outer diameter of between 8 mm and 22 mm are typically used, but sample containers having a very small inner diameter (e.g. 1 to 2 mm) may also be used. It should be noted that the present invention can be used with IR spectrometers both in reflection and in transmission.

We claim:

1. An infrared (IR) spectrometer for IR spectroscopic investigation of a test sample in a first wavenumber range, the spectrometer comprising:
    a sample container for holding the test sample, said sample container being transparent to IR radiation in the first wavenumber range; and
    a measuring device having an IR sensor for determining a temperature of the test sample, said IR sensor measuring, without contact, an Intensity of the IR radiation emitted by said sample container within a second wavenumber range, wherein said sample container is opaque to IR radiation in said second wavenumber range.

2. The IR spectrometer of claim 1, wherein said sample container completely fills an inspection window of said IR sensor.

3. The IR spectrometer of claim 1, wherein the first wavenumber range is in a near infrared range.

4. The IR spectrometer of claim 3, wherein said first wavenumber range is between 12800 $cm^{-1}$ and 4000 $cm^{-1}$.

5. The IR spectrometer of claim 1, wherein said second wavenumber range is in a mid infrared range.

6. The IR spectrometer of claim 5, wherein said second wavenumber range is between 2000 $cm^{-1}$ and 400 $cm^{-1}$.

7. The IR spectrometer of claim 1, wherein said sample container is surrounded by a temperature control block which can be heated or cooled by a temperature control system.

8. The IR spectrometer of claim 7, wherein said temperature control system is designed as a Peltier temperature control system.

9. The IR spectrometer of claim 7, further comprising a measuring chamber in which at least said IR sensor, said temperature control block and said sample container are arranged.

10. The IR spectrometer of claim 7, further comprising a temperature control loop which evaluates a temperature determined by said IR sensor for driving said temperature control system of said temperature control block.

11. A method for controlling the temperature control loop of the IR spectrometer of claim 10, wherein the temperature determined by the IR sensor is corrected with a calibration function such that a corrected temperature approximates an actual temperature of the test sample.

12. A method for IR spectroscopic measurement of a test sample using the IR spectrometer of claim 1, the method comprising the step of examining a test sample which is not opaque in the second wavenumber range.

\* \* \* \* \*